United States Patent [19]

Hulin

[11] 4,397,190

[45] Aug. 9, 1983

[54] APPARATUS AND METHOD FOR DETERMINING FLOW CHARACTERISTICS OF A FLUID

[75] Inventor: Jean-Pierre Hulin, Saint-Maur, France

[73] Assignee: Schlumberger Technology Corporation, New York, N.Y.

[21] Appl. No.: 217,620

[22] Filed: Dec. 18, 1980

[30] Foreign Application Priority Data

Dec. 28, 1979 [FR] France ............................. 79 31910

[51] Int. Cl.³ ........................... G01F 1/34; G01F 1/74
[52] U.S. Cl. .................................. 73/861.04; 73/154; 73/861.42
[58] Field of Search ............... 73/438, 861.04, 861.05, 73/861.06, 861.42, 61 R, 154

[56] References Cited

U.S. PATENT DOCUMENTS

| 2,439,723 | 4/1948 | Engdahl ......................... 73/861.04 |
| 3,403,554 | 10/1968 | Chevalier et al. |
| 3,465,582 | 9/1969 | Richter, Jr. et al. ................. 73/152 |
| 3,581,565 | 6/1971 | Dieterich . |
| 3,926,050 | 12/1975 | Turner et al. ..................... 73/438 X |
| 4,059,744 | 11/1977 | Elderton . |
| 4,231,262 | 11/1980 | Boll et al. ......................... 73/861.04 |
| 4,267,726 | 9/1981 | Noik ..................................... 73/151 |

FOREIGN PATENT DOCUMENTS 2161834  5/1974  France .

OTHER PUBLICATIONS

"Correlation Techniques Achieve Valid Flow Measurement Results", in Electronic Weekly, 9/23/70.

Primary Examiner—Herbert Goldstein
Attorney, Agent, or Firm—David H. Carroll

[57] ABSTRACT

A method and apparatus for determining the flow rate and other flow characteristics of a polyphase fluid or a turbulent single-phase fluid flowing in a conduit are disclosed. Two differential pressure sensors are provided, each having two pressure ports sensitive to local pressure variation in the fluid. The pressure ports are maintained in a predetermined spatial relationship and in a predetermined orientation relative to the general direction of the flow. The detection signals from the respective sensors are correlated to obtain the flow rate. Additionally, a selected one of the detection signals is processed to obtain other flow characteristics. One of these other flow characteristics, the type of flow, is useful in facilitating the determination of the flow rate.

11 Claims, 11 Drawing Figures

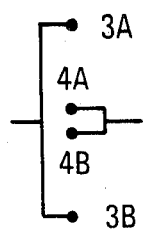
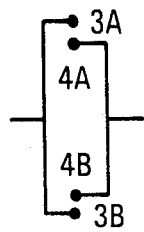
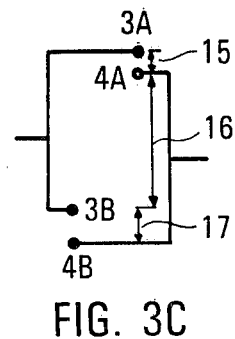
FIG. 3A    FIG. 3B    FIG. 3C
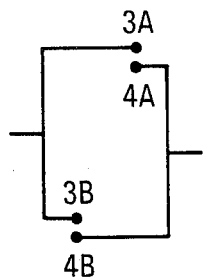
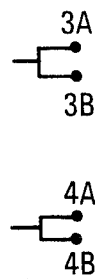
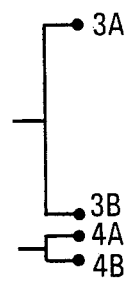
FIG. 3D    FIG. 3E    FIG. 3F
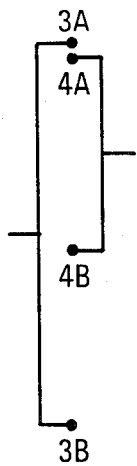
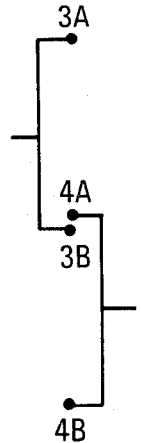
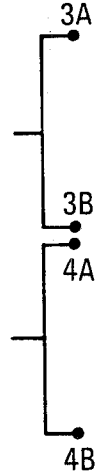
FIG. 3G    FIG. 3H    FIG. 3I

APPARATUS AND METHOD FOR DETERMINING FLOW CHARACTERISTICS OF A FLUID

BACKGROUND OF THE INVENTION

The present invention relates to apparatus and methods for determining flow characteristics of a fluid, and more particularly to apparatus and methods for determining the flow rate of a polyphase fluid or a turbulent single-phase fluid by detecting pressure gradients within the fluid.

Generally speaking, apparatus and methods for determining flow characteristics of a fluid are known. For example, French Pat. No. 2,161,834 (Applicant, Societe Nationale Des Petroles D'Aquitaine) is directed to the determination of the rate of flow of phase domaines in a polyphase fluid and to the determination of the composition of the polyphase fluid. The Patent discloses the use of a Wheatstone bridge as a differential sensor, a hot-film probe being included in each of the two branches of the Wheatstone bridge. One of the two probes of each differential sensor is placed at the core of the fluid flow and is subject to the influence of all local phenomena, while the other probe is isolated from this influence and serves as an average temperature reference. Two such differential sensors are used in determining the flow rate. The distance between the respective probes of the two sensors that are placed in the core of the flow is known, and the rate of flow of the domains is the ratio of this known distance to the time difference between the corresponding parts of the signals of the two sensors. This time difference is obtained by correlation.

This prior art apparatus has a number of disadvantages, including the fragility of the hot-film probes, and the unsuitability of the apparatus in the measurement of the rates of flow in streams of very different types and of the rates flow of bubbles. With regard to the last mentioned disadvantage, the determination of bubble speed requires that the bubble "bathe" the hot film of the core-immersed probe of the first sensor and subsequently "bathe" the hot film of the corresponding probe of the second sensor. This condition requires that the trajectory of the bubbles must go through the two probes, which is to say that the trajectory must not be disturbed by the presence of the probes. Consequently, this condition implies that the probes should be well separated from one another. The second condition is that the two phenomena must be correlated, which implies that the two probes should be very near one another. The compromise between these conditions is believed to be extremely delicate.

Electric probes having very thin and sensitive tips are used in the apparatus disclosed in U.S. Pat. No. 3,403,554, issued Oct. 1, 1968 to Chevalier et al. The operation of this apparatus also requires the direct contact of the bubbles with each of the two probes, and hence exhibits the associated disadvantages.

Another approach taken in the prior art is exemplified in an article entitled "Correlation Techniques Achieve Valid Flow Measurement Results" appearing in *Electronics Weekly*, Sept. 23, 1970. As disclosed therein, a thermocouple, one junction of which is in the flow, is used for each transducer. This approach shares certain of the disadvantages of the apparatus disclosed in French Pat. No. 2,161,834; in particular, the unsuitability of the apparatus in the measurement of rates of flow of streams of very different types and of the rates of flow of bubbles.

A differential pressure sensor is included in a known system which purportedly obtains an indication of the percentage of oil and/or water according to weight and volume in an oil-water mixture circulating in a pipeline, as disclosed in U.S. Pat. No. 4,059,744, issued Nov. 22, 1977 to Elderton. The sensor is used conventionally for deriving density, however.

As is therefore apparent, the prior art has not been able to achieve the determination in one apparatus of the rates of flow of turbulent single-phase fluids and of domains of phases contained in polyphase fluids within a wide range of flow types (e.g., extending from bubble flow to plug flow to slug flow in liquid-gas combinations). Furthermore, prior art apparatus generally have not been capable of utilization under very severe operating conditions such as those encountered in producing oil wells, and have not been applicable to the measurement of the speed of bubbles or small domains flowing in a polyphase fluid.

SUMMARY OF THE INVENTION

An object of the present invention therefore is to provide a versatile method and apparatus for obtaining a determination of flow characteristics, especially flow rate, under very severe operating conditions such as those encountered in producing oil wells.

Another object of the present invention is to obtain a determination of the speed of bubbles or small domains flowing in a polyphase fluid.

Another object of the present invention is to obtain the determination of the rate of flow of phase domains in polyphase fluids within a wide range of flow types, extending for example in liquid-gas mixtures from bubble flow to plug flow or slug flow.

Another object of the present invention is to obtain the determination of the rate of flow of a single-phase fluid under turbulent flow conditions.

Another object of the present invention is to eliminate certain phenomena inherent in the observation of local pressure which disadvantageously occur; for example, road noise.

The aforementioned objects are achieved in accordance with the present invention by an apparatus for determining at least one flow characteristic of a fluid, which may be either a polyphase fluid or a turbulent single-phase fluid, flowing in a vertical conduit such as a producing oil well, which apparatus comprises a first differential pressure sensor, a second differential pressure sensor, and a support structure. Each differential pressure sensor includes a differential pressure transducer and two sensitive points each responsive to local pressure variation in the fluid, for obtaining a detention signal representative of the instantaneous fluctuations of the pressure gradient in a portion of the fluid therebetween. The first and second sensors are rigidly secured to the support structure for maintaining a predetermined spatial relationship between the sensitive points thereof and for maintaining the sensitive points thereof in at least one predetermined orientation relative to the general direction of flow of the fluid.

In another embodiment, the apparatus summarized above includes a signal processing means for obtaining the at least one flow characteristic from at least one of the detection signals.

The aforementioned objects are achieved in accordance with the present invention by a method for determining at least one flow characteristic of a fluid, which may be either a polyphase fluid or a turbulent single-phase fluid, flowing in a substantially vertical conduit such as a producing oil well. This method comprises the steps of disposing the sensitive points of a first pair of sensitive points and a second pair of sensitive points in predetermined spatial relationships within a core portion of the flow such as to undergo local pressure variations related to the flow, and aligned linearly and parallel to the general direction of the flow. This method also includes the steps of detecting an instantaneous differential pressure representative of instantaneous fluctuations of the pressure gradient in a portion of the fluid between the sensitive points of the first pair and the second pair respectively; producing from the respective results of the detecting step respective detection signals representative of the detected instantaneous differential pressures; and determining the at least one flow characteristic from at least one of the detection signals.

In another embodiment, the method summarized above is applied to the determination of the flow rate of the fluid, and further comprises the step of identifying the type of fluid so that a characteristic distance is selected for the determining step.

Other objects, features, and characteristics of the present invention will become apparent upon consideration of the following Detailed Description and the appended Claims, with reference to the accompanying Drawings, all of which are part of this Specification.

BRIEF DESCRIPTION OF THE DRAWINGS

In the drawings, where like reference characters indicate like parts,

FIGS. 3A-3I are schematic drawings representing various possible arrangements of sensitive points.

DETAILED DESCRIPTION OF THE PREFERRED EMBODIMENTS

Although the present invention is particularly advantageous for use in determining the flow characteristics of a fluid in a vertical or oblique conduit presenting an unusually severe operating environment, such as, for example, a conduit (production string) 1 of an oil well (see FIG. 1), it is useful generally for determining the flow characteristics of a fluid. The flow characteristics determined include the type of flow, the proportion of a phase present in a polyphase fluid, the time of passage of large phase domains of a polyphase fluid, and the rate of flow. The fluid may be a single-phase type in turbulent flow, but the present invention is particularly advantageous when applied to fluids of the polyphase type. Examples of polyphase fluids are water and gas combinations, liquid hydrocarbons and water combinations, liquid hydrocarbons and gas conbinations, or combinations of water, gas, and liquid hydrocarbons. In such fluids, the flow rate is related to the gas phase, and the flow rate is determined with respect to gas phase domains of varying size, ranging from relatively large phase domains 2A such as gas plugs or slugs occupying most of the conduit diameter, to relatively small phase domains 2B such as bubbles generally occupying no more than one-quarter or drops generally occupying no more than one-third the diameter of the conduit 1.

Figure 1:
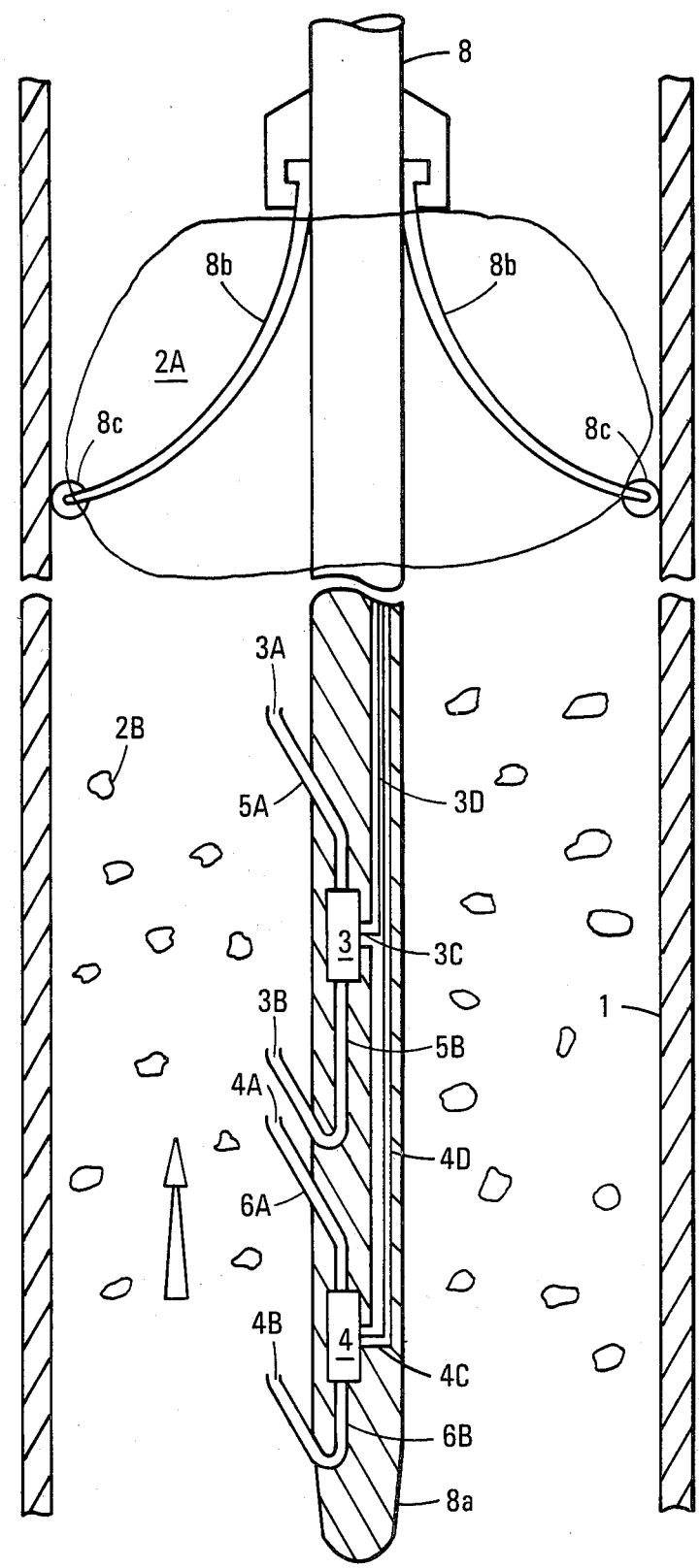
FIG. 1 is a partial schematic, partial sectional view of one embodiment of the present invention, showing a vertical conduit in which the embodiment is disposed.
Figure 2:
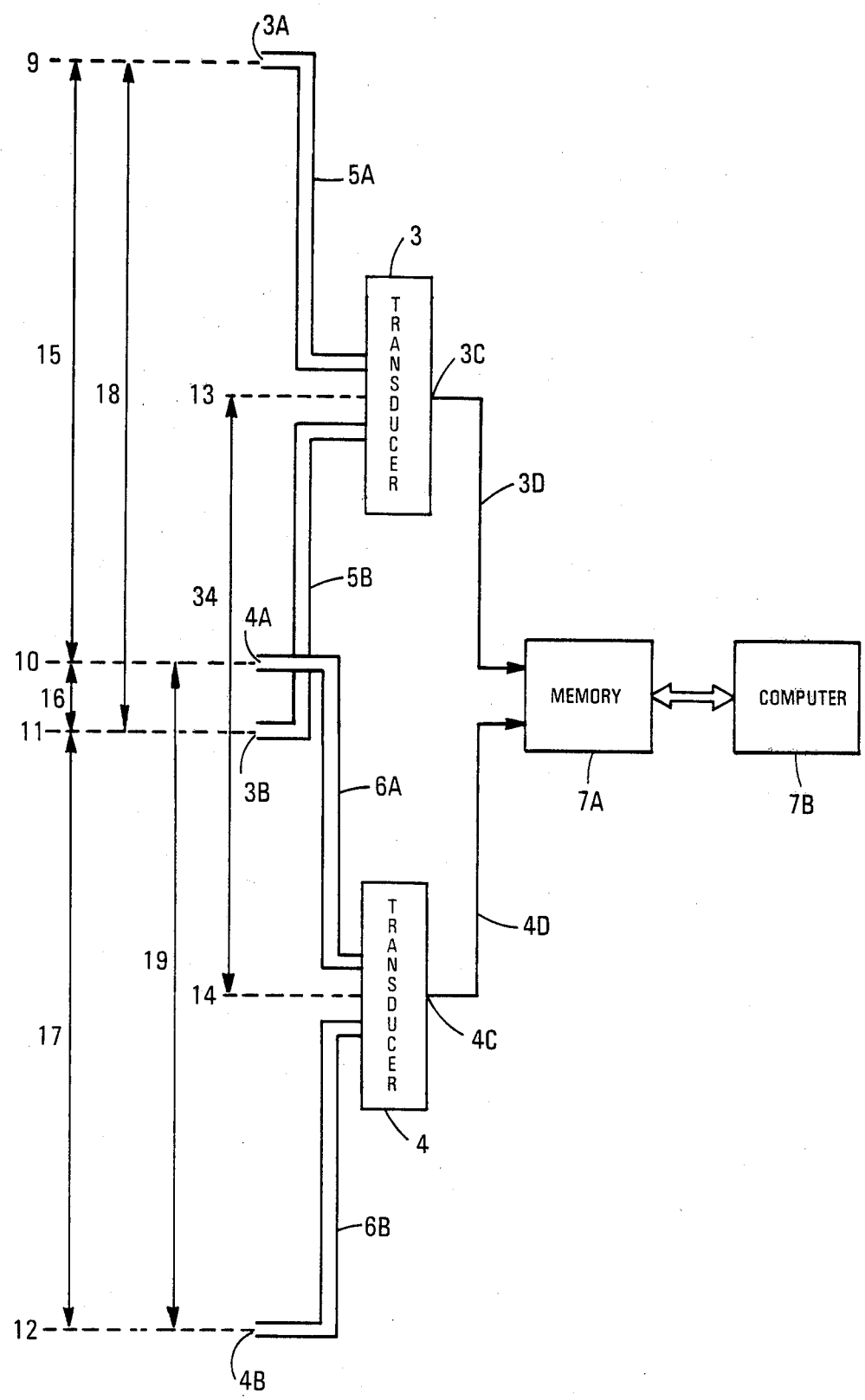
FIG. 2 is a schematic drawing of another embodiment of the present invention, showing an electrical connection of two differential pressure transducers in accordance with the teachings of the present invention.

The preferred embodiments shown in FIGS. 1 and 2 include respective differential pressure transducers 3 and 4 each connected to a pair of sensitive points, such as pressure ports or taps, which are immersed in the fluid. Such differential pressure transducers eliminate the problem of road noise inherent in the observation of local fluid pressure. For example, pressure transducer 3 is connected to pressure ports 3A and 3B by conduits 5A and 5B respectively; while pressure transducer 4 is connected to pressure ports 4A and 4B by conduits 6A and 6B respectively. Pressure ports 3A, 3B and 4A, 4B, and conduits 5A, 5B and 6A, 6B have a circular section of approximately 1.6 mm in diameter. Pressure ports 3A, 3B and 4A, 4B are directed in the general direction of fluid flow, as shown in FIG. 1, which enables a less noisy detection signal to be obtained, particularly in the measurement of plug flow or slug flow. Conduits 5A, 5B and 6A, 6B preferably are filled with a condensed phase of the flowing fluid.

The versatility of the present invention is found in the various arrangements of the sensitive points within the fluid. As discussed below with reference to FIGS. 3A–3I, optimum arrangements are defined for specific types of polyphase fluid flow and for a turbulent single-phase fluid, and two particularly interesting arrangements are defined that are suitable for flow rate measurements in the pressure of the small phase domains and large phase domains of a polyphase fluid, and the turbulence of a single-phase fluid in turbulent flow.

In FIGS. 3A–3I, the dark points represent the individual sensitive points within the fluid flow. The line connecting two sensitive points indicate that the pair is associated with a single transducer. The direction of fluid flow is parallel to the length of the FIGS. 3A–3I and in most cases the sensitive points are aligned linearly and parallel to the general direction of flow. The exceptions are found in FIGS. 3C and 3D. In the arrangement of FIGS. 3C and 3D, mutual alignment is required only of the sensitive points of the two heterogeneous couples (i.e., couple 3A and 4A and couple 3B and 4B, as defined below), provided that (a) the two couples are subjected to equivalent measurement conditions (i.e., the speeds of the small phase domains 2B in the respective vicinities of the two couples have identical distributions), or (b) the two couples are subjected to totally different measurement conditions (i.e., one couple is placed in the fluid flow and the other is placed against the wall of the conduit). The arrangements of sensitive points shown in FIGS. 3C and 3D are not suitable in determining type of flow, the proportion of a phase present in a polyphase fluid, and the time of passage of large phase domains of a polyphase fluid if only a single transducer is employed. These determinations require that two sensitive points be aligned linearly and parallel to the general direction of flow, which of course would not be the case if a single transducer having its sensitive points arranged as shown in either FIG. 3C or 3D were used.

In discussing the arrangements of FIGS. 3A–3I, reference will be made to certain "levels", each defined by planes perpendicular to the direction of fluid flow, and certain "intervals" defined therebetween and normal thereto. These levels and intervals are illustrated schematically in FIG. 2. Levels 9, 10, 11, and 12 correspond to successive positions at which the respective sensitive points are situated. Median levels 13 and 14 correspond to positions intermediate respective pairs of associated sensitive points; specifically, level 13 is intermediate pressure ports 3A and 3B, which are associated with transducer 3; and level 14 is intermediate pressure ports 4A and 4B, which are associated with transducer 4. Intervals 15, 16, and 17 correspond to the distances between adjacent levels 9 and 10, 10 and 11, and 11 and 12 respectively. Intervals 18 and 19 correspond to the distances between the paired sensitive points; specifically, interval 18 is defined between levels occupied by pressure ports 3A and 3B, and interval 19 is defined between levels occupied by pressure ports 4A and 4B (in FIG. 2, levels 9 and 11, and 10 and 12 respectively). Interval 34 is defined between median levels 13 and 14. Reference also will be made to certain terms. A heterogeneous interval is an interval defined between successive levels occupied by respective sensitive points associated with different transducers (e.g., intervals 15, 16, and 17 in FIG. 2 are heterogeneous intervals). Interval 16, defined between levels 10 and 11, is considered an intermediate interval (intermediate intervals 15 and 17).

In the determination of the rate of flow of large phase domains 2A, it is advantageous to align the four sensitive points 3A, 3B and 4A, 4B linearly and parallel to the general direction of flow and in the core of the fluid flow. It also is advantageous to set the interval between the median levels 13 and 14 to a length (a) greater than or equal to one-third the length of the largest of the intervals 15, 16 and 17, and (b) between about a half-diameter and one diameter of the conduit 1. Typically, the interval between the median levels 13 and 14 is between 6 and 12 centimeters. According to these criteria, the configurations of FIGS. 3A, 3B, 3C and 3D are not advantageous for the determination of the speed of the large phase domains 2A. The configurations of FIGS. 3F and 3G are advantageous, while the configurations of FIGS. 3E, 3H and 3I are particularly advantageous. It also is advantageous to set the intervals 15, 16 and 17 in the particularly advantageous configurations of FIGS. 3E, 3H and 3I such that the sum of their lengths is greater than or equal to the dimension of the large phase domains 2A measured along the direction of fluid flow. According to this criteria, the configuration of FIG. 3E is preferable to the others for the observation of large phase domains 2A, at least for an equivalent size. The configuration of FIG. 3E is not advantageous in the measurement of the rate of flow of small phase domains 2B, however, as explained below.

In the determination of the rate of flow of small phase domains 2B, or in the determination of the rate of flow of single-phase fluids in turbulent flow, it is advantageous for at least one of the heterogeneous intervals (e.g., interval 16 in FIG. 2) to be less than or equal to half the length of each of the intervals 18 and 19. According to this criteria, the configurations of FIGS. 3A, 3E and 3F are not advantageous. Furthermore, it also is advantageous that any heterogeneous interval greater in length than the smallest of the three intervals 15, 16 and 17 be greater than or equal to twice the length thereof. According to this criteria, the configuration of FIG. 3C, in which the smallest interval 15 is greater than half the heterogeneous interval 17 but smaller than heterogeneous interval 17, is not advantageous. The configurations of FIGS. 3B and especially 3D, in which the end-most heterogeneous intervals 15 and 17 are of equal length, are particularly advantageous in the measurement of the speed of small phase domains 2B or of turbulant single-phase fluids. The configurations of FIGS. 3G, 3H and 3I are slightly less advantageous than the configurations of FIGS. 3B and 3D, but are quite advantageous nonetheless. Concerning the configurations of FIG. 3B, 3D, 3G, 3H and 3I, it is advantageous that the smallest of the three intervals 15, 16 and 17 (which is necessarily a heterogeneous interval in conformity with the aforementioned criteria) has a length less than or equal to 10 times the average size of the small domains 2B, measured along the direction of fluid flow. Typically, the length of the smallest of the intervals 15, 16 and 17 will measure from 1 to 2 centimeters.

In accordance with the aforementioned criteria, only the configurations of FIGS. 3G, 3H and 3I are advantageous in determining the rates of flow of large phase domains 2A as well as small phase domains 2B and turbulant single-phase fluid. Furthermore, it is advantageous for the intermediate interval 16 to be a heterogeneous interval and that its length be less than or equal to half, and preferably less than one-fourth, the length of the other two intervals 15 and 17. It is further advantageous to provide equal intervals 18 and 19, typically between 5 and 10 centimeters. The configurations of FIGS. 3H and 3I conform to these criteria, and therefore are particularly advantageous for measuring generally the flow characteristics of a fluid. These configurations are illustrated in FIGS. 2 and 1, respectively.

The configuration of FIG. 3I, which has only a single heterogeneous interval, the intermediate interval 16, is preferred to even to the configuration of FIG. 3H, because the conduits 5A, 5B and 6A, 6B are more simply manufactured and installed in the former configuration as compared with the latter configuration.

The transducers 3 and 4 deliver on their respective outputs 3C and 4C respective electric detection signals representative of the difference in pressure between the respective associated pressure ports 3A, 3B and 4A, 4B. The detection signals from transducers 3 and 4 are transmitted via respective conductors 3D and 4D to a memory 7A for recordation in any suitable manner, many of which are well known to those of ordinary skill in the art. The pressure transducers 3 and 4 preferably have a bandwidth of several hundred hertz, although a lower bandwidth such as, for example, a hundred hertz is acceptable. Suitable pressure transducers include the devices sold by the Validyne Company of Northridge, Calif. under the reference DP9 and DP7.

A suitable support 8 is provided to maintain the transducers 3 and 4, pressure ports 3A, 3B and 4A, 4B, and conductors 3D and 4D in suitable predetermined positions. The support 8 can take on a variety of forms and consist of a variety of materials well known to one of ordinary skill in the art. Of course, the selected materials and form must be capable of satisfying the requirements of the preferred embodiments shown in FIGS. 1 and 2, which include maintaining pressure ports 3A, 3B and 4A, 4B in the selected spatial relationship, within the core of the fluid flow at a distance from the conduit wall of conduit 1 such that the pressure ports 3A, 3B and 4A, 4B are the scene of local pressure variations actually representative of the flow. For example, the support 8 shown in FIG. 1 includes an elongated body member 8A enveloping the transducers 3 and 4 and integral with centering elements such as, for example, springs 8B terminated by rollers 8C bearing on the inside wall of the conduit 1. The support 8 is secured to an armored cable (not shown) which in turn is connected to suitable surface apparatus, such as memory 7A and computer 7B, in any one of a number of ways well known to one of ordinary skill in the art. The armored cable permits vertical control of the motion of support 8 and associated elements and provides means for conveying the respective detection signals from transducers 3 and 4 to the surface apparatus.

The processing of the detection signals from transducers 3 and 4 is performed by a computer 7B, which may be a logic or analog circuit or a programmable general purpose computer, in cooperation with memory 7A (see FIG. 2). Such flow characteristics as the proportion of a phase present in a polyphase fluid, the type of flow, and the time required for the passing of a large phase domain 2A past the associated sensitive points of a transducer (i.e., the elapsed time between the moment such a domain reaches one sensitive point and the moment it leaves the other sensitive point) are determined from the detection signal of a single transducer. The flow characteristic of rate of flow is determined from the respective detection signals of two or more transducers.

The processing of the detection signal from a single transducer to obtain the proportion of a phase present in a polyphase fluid involves determining the fraction of time during which the amplitude of the detection signal is between two limits. These limits are defined as being located on each side of the amplitude exhibited by the detection signal when the two sensitive points associated with the transducer are bathed by the same domain of the phase observed, at a distance which corresponds to the uncertainty of the measurement. When the conduit is not horizontal, the detection signal depends upon the hydrostatic pressure between the sensitive points, and hence upon the density of the phase in which the taps are immersed and also on the nature of the phase. Accordingly, if the sensitive points are sufficiently close, the amplitude of the detection signal is representative of the phase covering the sensitive points.

Identification of the type of flow can be obtained directly by determining the proportion of a phase of the fluid, as described above. Alternately, the processing of the detection signal from a single transducer to identify the type of flow involves conventional spectral analysis, to identify the frequency present with the greatest amplitude in the detection signal. The appearance of a dominant frequency lower than about one hundred hertz characterizes plug flow or slug flow, for example.

The processing of the detection signal from a single transducer to identify the passage time of a large phase domain 2A in front of the two sensitive points associated with the transducer involves obtaining the width of an auto-correlation peak of the detection signal, from which the passage time may be determined as well known to one of ordinary skill in the art.

The processing of the detection signals from two transducers to obtain the rate of flow may involve either of the two processes described below. These processes are described with reference to FIG. 2, wherein memory 7A may be a mass memory and computer 7B a programmable computer having access to the data recorded in memory 7A and suitably programmed to implement the processes described below. Computer 7B is selectively supplied with the value of the length of interval 16, which is the intermediate interval, or interval 34, which is the length between median levels 13 and 14, for the reason described below.

One processing approach involves determining the difference to be introduced between the detection signals so that they correspond as well as possible (i.e., finding the time abscissa of the maximum correlation of the two detection signals, such correlation being well known to one of ordinary skill in the art). This time abscissa then is divided into a distance characteristic of the spatial arrangement of the transducers. For example, when the rate of flow being obtained is that of small phase domains 2B, or of a turbulent single-phase fluid, this characteristic distance is the length of the smallest heterogeneous interval 16. When the rate of flow being obtained is that of the large phase domains 2A, this characteristic distance is the length of the interval 34 between the median levels 13 and 14.

Another processing approach involves looking for the time difference corresponding to the phase shift between the Fourier components of the two detection signals and in dividing this time difference by the appropriate characteristic distance. As is well known to one of ordinary skill in the art, practically, the phase shift ($\Delta\phi$) taken from the complex cross spectrum is represented as a function of the pulsation ($\omega$). The time difference is defined by the characteristic slope of the curve so obtained.

Of course, increasing the number of transducers beyond two makes it possible basically to increase the precision of the measurements with the use of multiple correlations.

While the invention has been described in accordance with the preferred embodiments as presently conceived, it is to be appreciated that the preferred embodiments are also illustrative embodiments and that the invention is not intended to be limited to the disclosed preferred embodiments. Modifications of the present invention not described herein will become apparent to those of ordinary skill in the art after a perusal of this disclosure. For example, it is stated above that identification of the type of flow can be obtained from a single detection signal by determining the proportion of a phase of the fluid or by applying spectral analysis to identify the appearance of a frequency lower than about one hundred hertz characteristic of plug flow or slug flow. It also is stated above that the processing of the detection signals from two transducers to obtain the rate of flow requires the appropriate characteristic distance. Therefore, it is apparent that computer 7B additionally can be programmed to obtain the characteristic distance by selecting between the respective values of the lengths of intervals 16 and 34, in accordance with the type of flow identified. Such modifications, as well as equivalent methods and arrangements, are within the spirit and scope of the invention as expressed in the appended claims.

What is claimed is:

1. An apparatus for producing signals indicative of at least one flow characteristic of a polyphase or turbulent single-phase fluid flowing in a well, comprising:
   a first differential pressure sensor, including a differential pressure transducer and two sensitive points each responsive to local pressure variation in said fluid, for obtaining a detection signal representative of the instantaneous fluctuations of the pressure gradient in a portion of said fluid therebetween;
   a second differential pressure sensor, including a differential pressure transducer and two sensitive points each responsive to local pressure variation in said fluid, for obtaining a detection signal representative of the instantaneous fluctuations of the pressure gradient in a portion of said fluid therebetween; and an elongated support structure, adapted for displacement in the well, to which the sensitive points of said first and second sensors are fixedly connected:
in a linear arrangement substantially parallel to the direction of fluid flow and within a core portion of said fluid flow; and
at respective levels separated by consecutive intervals, a first median level being defined intermediate the respective levels of the sensitive points of said first sensor and a second median level being defined intermediate the respective levels of the sensitive points of said second sensor; the distance between said first median level and said second median level being no less than one-third the length of one of said consecutive intervals that is no smaller than any other of said consecutive intervals; and the distance between said first median level and said second median level being between a half-diameter and one diameter of the well.

2. An apparatus as in claim 1, wherein the sum of the lengths of said consecutive intervals is no less than an expected size of large phase domains along the direction of fluid flow.

3. An apparatus for producing signals indicative of at least one flow characteristic of a polyphase or turbulent single-phase fluid flowing in a well, comprising:
a first differential pressure sensor, including a differential pressure transducer and two sensitive points each responsive to local pressure variation in said fluid, for obtaining a detection signal representative of the instantaneous fluctuations of the pressure gradient in a portion of said fluid therebetween;
a second differential pressure sensor, including a differential pressure transducer and two sensitive points each responsive to local pressure variation in said fluid, for obtaining a detection signal representative of the instantaneous fluctuations of the pressure gradient in a portion of said fluid therebetween; and
an elongated support structure, adapted for displacement in the well, to which the sensitive points of said first and second sensors are fixedly connected at respective levels separated by consecutive intervals; at least one of said consecutive intervals being a heterogeneous interval no greater than one-half the distance between the two sensitive points of each of said first and second differential pressure sensors.

4. An apparatus as in claim 3, wherein any of said consecutive intervals that is a heterogeneous interval and greater in length than a smallest one of said consecutive intervals, is no less than twice the length thereof.

5. An apparatus as in claim 4, wherein a smallest one of said consecutive intervals is a heterogeneous interval of a length no greater than ten times an expected average size of small phase domains along the direction of flow.

6. An apparatus for producing signals indicative of at least one flow characteristic of a polyphase or turbulent single-phase fluid flowing in a well, comprising:
a first differential pressure sensor, including a differential pressure transducer and two sensitive points each responsive to local pressure variation in said fluid, for obtaining a detection signal representative of the instantaneous fluctuations of the pressure gradient in a portion of said fluid therebetween;
a second differential pressure sensor, including a differential pressure transducer and two sensitive points each responsive to local pressure variation in said fluid, for obtaining a detection signal representative of the instantaneous fluctuations of the pressure gradient in a portion of said fluid therebetween; and
an elongated support structure, adapted for displacement in the well, to which the sensitive points of said first and second sensors are fixedly connected:
in a linear arrangement substantially parallel to the direction of fluid flow and within a core portion of said fluid flow; and
at respective levels separated by consecutive intervals, a first median level being defined intermediate the respective levels of the sensitive points of said first sensor and a second median level being defined intermediate the respective levels of the sensitive points of said second sensor; the distance between said first median level and said second median level being no less than one-third the length of one of said consecutive intervals that is no smaller than any other of said consecutive intervals; the distance between said first median level and said second median level being between a half-diameter and one diameter of the well; and at least one of said consecutive intervals being a heterogeneous interval no greater than one-half the distance between the two sensitive points of each of said first and second differential pressure sensors.

7. An apparatus as in claim 6, wherein any of said consecutive intervals that is a heterogeneous interval and greater in length than a smallest one of said consecutive intervals, is no less than twice the length thereof.

8. An apparatus as in claim 7, wherein a smallest one of said consecutive intervals is a heterogeneous interval of a length no greater than ten times an expected average size of small phase domains along the direction of flow.

9. An apparatus as in claim 8, wherein:
an intermediate one of said consecutive intervals is a heterogeneous interval no greater than one-fourth the length of the other of said consecutive intervals respectively; and
said first interval and said second interval are of equal length.

10. An apparatus as in claim 9, wherein an intermediate one of said consecutive intervals is the only heterogeneous interval.

11. An apparatus as in claim 6, wherein:
an intermediate one of said consecutive intervals is a heterogeneous interval no greater than one-half the length of the other of said consecutive intervals respectively; and
said first interval and second interval are of equal length.

* * * * *